July 19, 1960

A. J. WASLEY 2,945,707

BEARING SEAL

Filed Oct. 15, 1956

INVENTOR

BY *Larson and Taylor*

ATTORNEYS

United States Patent Office 2,945,707
Patented July 19, 1960

2,945,707

BEARING SEAL

Arthur Justin Wasley, Bristol, Conn., assignor to Wasley Products, Incorporated, Plainville, Conn., a corporation of Connecticut Filed Oct. 15, 1956, Ser. No. 615,907

1 Claim. (Cl. 286—5)

This invention relates to a bearing seal and more particularly to a resilient member which is adapted to be disposed between inner and outer races of a bearing to act as a closure member for the lubricant-containing chamber housing the antifriction members.

There have been numerous bearing seals of varying configuration developed heretofore but such seals do not possess the requisite strength characteristics or provide a sufficiently effective seal. Furthermore, prior art seals present molding difficulties. Prior art seals are normally provided with rigidifying means which prevent their ready insertion and removal from bearing races without distortion.

The present invention provides a bearing seal which may be readily molded and which provides a most efficient seal for the bearing races and yet is not difficult to insert in use. The presently disclosed seal comprises a resilient ring-shaped member having an enlarged outer peripheral portion which is adapted to fit within a recess in the outer concentric bearing race. The inner peripheral edge portion is slightly tapered and is adapted to wipe against a shoulder on the inner race to insure an effective seal for the bearing. A metallic member is embedded within the resilient member and extends between points spaced a substantial distance from the peripheral portions of the seal. The metallic insert functions to provide sufficient rigidity to the sealing element to maintain the resilient element in the correct position. However, the metallic member does not extend adjacent the outer peripheral portion so that the seal could not be readily snapped into the recess in the outer concentric race nor does the metallic member extend inwardly adjacent the inner peripheral portion so as to give the seal undue rigidity where some flexibility is required. The seal may be provided with a portion extending outwardly normally with respect to the plane of the seal and this flanged portion in combination with a slinger forms a labyrinth passage to prevent dust and dirt from entering the lubricant-filled chamber.

By providing the metallic member with a flanged portion the seal lends itself to a simple molding technique. The metallic insert may be placed within the mold half and the edge of the flange will rest upon the bottom of the mold. The synthetic material is placed in slugs in the mold, the mold is heated under pressure and the molten material cured within the mold so that the major portion of the metallic member becomes completely embedded within the material to insure a complete and satisfactory bond between the metallic member and the resilient material. This obviates one of the major disadvantages of prior art bearing seals utilizing metallic supporting elements. Where the metallic element was bonded principally on one face to the resilient material, the bond was subjected to considerable stress and strain due to irregular movements of the inner race and consequently the bond was frequently broken thus rendering the seal ineffective.

An object of the present invention is to provide a bearing seal which is provided with a strengthening member embedded therein to provide sufficient rigidity for the seal and yet permit ready insertion and removal of the seal from the bearing.

Another object of the present invention is to provide a bearing seal having a metallic member inserted therein, which seal may be readily molded by a comparatively simple technique.

Still another object of the present invention is to provide a resilient bearing seal with a metallic element embedded therein in which a flange portion is provided extending normally with respect to the plane of the seal to form a labyrinth passage to protect the bearing from foreign matter.

Other objects and many of the attendant advantages of the present invention will become apparent upon consideration of the following detailed specification when considered in connection with the accompanying drawing wherein.

Figure 1:
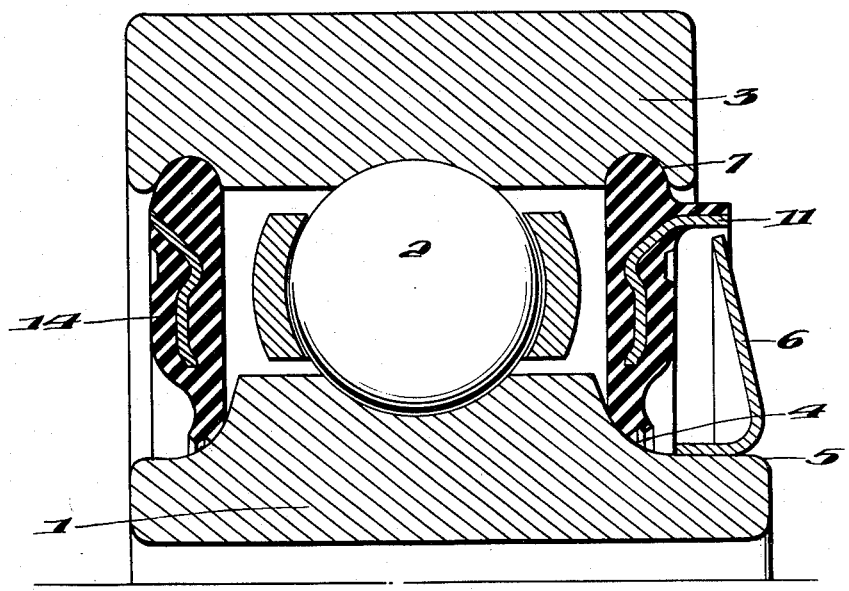
Fig. 1 is a cross-sectional view of a bearing showing the inner and outer races and showing two types of bearing seals according to the present invention.

Referring now to the drawings in more detail there is shown at 1 in Fig. 1 an inner race for a ball bearing 2 having an outer race 3. The present invention is specifically designed for a structure in which the inner race 1 is rotatable with a shaft and the outer race 3 is fixed although it is apparent that the design of the seal may be readily modified for other types of bearings. The inner race is provided with a curved shoulder 4 and an outer circular portion 5. Fixed to this outer portion 5 in any suitable manner is a slinger element 6 which is provided with an upstanding flange portion which extends across substantially the entire area between the inner and outer races. The outer race has a recess 7 into which the bearing seal is adapted to fit.

Figure 2:
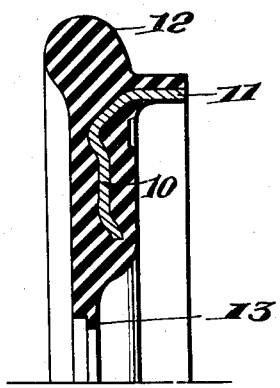
Fig. 2 is a cross-sectional view of the bearing seal as it is removed from the mold.
Figure 3:
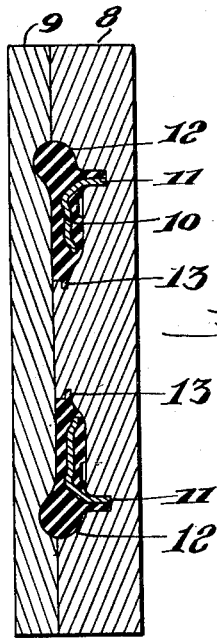
Fig. 3 is a cross-sectional diagrammatic showing of the mold and method of forming the bearing seal. The mold is shown on end for the sake of convenience.

As shown in Fig. 3 the seal is formed by a molding process. The mold halves 8 and 9 are shaped as shown and a metallic member 10 having a peripheral flange 11 is inserted in the mold half 8 with the edge of the flange resting in the mold. Slugs of resilient material are placed in the mold, the mold heated under pressure to melt the material, and the material is cured so that a seal is formed which is shaped as shown in Fig. 2.

It can be seen from Fig. 2 that the seal is provided with an enlarged outer peripheral portion 12 which is free of the metallic insert and not rigidly supported thereby so that a degree of resiliency is given this portion to permit it to be snapped within the recess 7 of the outer concentric race without distortion of the metallic member. The inner peripheral portion 13 of the seal is slightly tapered as shown and it will be noted that the metallic member 10 does not extend into this portion of the seal so that sufficient resiliency is provided to permit this portion to have intimate contact with the shoulder 4 of the inner race. Thus, the metallic member 10 is embedded in the seal only in the mid-portion thereof and serves to provide a degree of rigidity necessary in order to insure effective sealing action. The flange portion 11 extends outwardly as shown and it will be seen from Fig. 1 that this portion cooperates with the slinger 6 to form a labyrinth passage to assist in excluding foreign matter from the bearing.

If it is essential to provide a flush-type seal, the flange portion 11 may be cut off and the slinger 6 eliminated so that a seal such as is shown at 14 in Fig. 1 is formed.

It can be seen that by virtue of the present invention a bearing seal is provided which may be readily molded and inserted in position between the bearing races. By providing an enlarged resilient peripheral portion without rigidifying members, the seal may be snapped into position in the outer concentric ring without distortion of the metallic member. The inner peripheral portion of the seal cooperates with a shoulder on the inner bearing race and will form an effective closure plate for the bearing. The metallic element is completely embedded within the resilient material and thus there is no danger of the bond between this element and the resilient material being torn. Corrosion of the metallic member and possible contamination of the lubricant is forestalled by completely embedding the metallic member in the resilient material. The flange portion of the seal forms a labyrinth passage which insures even greater sealing action.

Obviously, many modifications and variations of the present invention are possible in the light of the above teachings. It is to be understood that the scope of the invention is limited only by the appended claims. What is claimed as new and desired to be secured by Letters Patent is:

A resilient seal for a bearing having inner and outer races, the inner race having a shoulder portion and the outer race having a recess therein, the seal comprising a ring shaped resilient member having an outer peripheral enlarged portion adapted to fit within the recess in the outer race, a tapered inner peripheral portion adapted to engage the shoulder portion of the inner race, a metallic member completely embedded within said resilient member, said member having one end portion extending normally with respect to the resilient member, said end portion forming a flange adjacent the enlarged portion, said member extending between a point adjacent said enlarged portion and a point adjacent said tapered portion, said enlarged portion and said portion engaging the shoulder being solely of resilient material, a slinger fixedly mounted on the inner race, the flange on the metallic member extending over and outside the outer peripheral edge of the slinger, said slinger and the flange forming a labyrinth sealing passage for the bearing.

References Cited in the file of this patent
UNITED STATES PATENTS

| | | |
|---|---|---|
| 2,467,049 | Peterson | Apr. 12, 1949 |
| 2,639,954 | Potter | May 26, 1953 |
| 2,720,404 | Saywell | Oct. 11, 1955 |
| 2,723,869 | Cobb | Nov. 15, 1955 |
| 2,736,583 | Marvin | Feb. 28, 1956 |
| 2,755,113 | Baumheckel | July 17, 1956 |
| 2,819,100 | Peterson | Jan. 7, 1958 |
| 2,856,208 | Cobb | Oct. 14, 1958 |
| 2,857,179 | Riesing | Oct. 21, 1958 |